US012720274B2

(12) United States Patent
Gutierrez et al.

(10) Patent No.: US 12,720,274 B2
(45) Date of Patent: Aug. 25, 2026

(54) METHODS, APPARATUS AND SYSTEMS FOR CONTROLLING DOPPLER EFFECT MODELLING

(71) Applicant: DOLBY INTERNATIONAL AB, Dublin (IE)

(72) Inventors: Rodrigo Andres Gutierrez, Vienna (AT); Leon Terentiv, Erlangen (DE); Panji Setiawan, Munich (DE); Daniel Fischer, Fuerth (DE); Christof Fersch, Neumarkt (DE)

(73) Assignee: DOLBY INTERNATIONAL AB, Dublin (IE)

( * ) Notice: Subject to any disclaimer, the term of this patent is extended or adjusted under 35 U.S.C. 154(b) by 115 days.

(21) Appl. No.: 18/704,012

(22) PCT Filed: Oct. 27, 2022

(86) PCT No.: PCT/EP2022/080117
§ 371 (c)(1),
(2) Date: Apr. 23, 2024

(87) PCT Pub. No.: WO2023/073120
PCT Pub. Date: May 4, 2023

(65) Prior Publication Data
US 2024/0430639 A1 Dec. 26, 2024

Related U.S. Application Data

(60) Provisional application No. 63/273,185, filed on Oct. 29, 2021.

(30) Foreign Application Priority Data

Nov. 1, 2021 (EP) .................................... 21205769

(51) Int. Cl.
*H04S 7/00* (2006.01)

(52) U.S. Cl.
CPC .............. *H04S 7/307* (2013.01); *H04S 7/302* (2013.01); *H04S 2400/11* (2013.01); *H04S 2420/03* (2013.01)

(58) Field of Classification Search
CPC ...... H04S 7/306; H04S 2420/01; H04S 7/304; H04S 7/303; H04S 2400/11; H04S 3/004; H04S 2400/15; G06F 3/165; G06F 3/012
See application file for complete search history.

(56) References Cited

U.S. PATENT DOCUMENTS 5,587,936 A 12/1996 Levitt
5,636,283 A * 6/1997 Hill ......................... H04S 7/302
84/630

(Continued)

FOREIGN PATENT DOCUMENTS

JP 2008194208 A 8/2008
JP 2018023601 A 2/2018

(Continued)

OTHER PUBLICATIONS

"MPEG-I Immersive Audio Architecture and Requirements", A 133. MPEG Meeting; Jan. 11, 2021-Jan. 15, 2021; Online; (Motion Picture Expert Group or ISO/IEC JTC1/SC29/WG11), No. n20143, Jan. 19, 2021 (Jan. 19, 2021), XP030290173, Retrieved from the Internet: URL:https://dms.mpeg.expert/doc_end_user/documents/133_OnLine/wgll/MDS20143_WG06_N00028.zip N0028_(MPEG-I_Audio_Arch_Req) .docx [retrieved on Jan. 19, 2021] pp. 3, 5.

(Continued)

*Primary Examiner* — Brian T Pendleton

(57) ABSTRACT

Described is a method of modelling a Doppler effect when rendering audio content for a 6 degrees of freedom (6DoF) environment on a user side. In particular, the method may comprise obtaining first parameter values of one or more (Continued)

first parameters indicative of an allowable range of pitch factor modification values. The method may further comprise obtaining a second parameter value of a second parameter indicative of a desired strength of the to-be-modelled Doppler effect. The method may yet further comprise determining a pitch factor modification value based on a relative velocity between a listener and an audio source in the audio content, and the first and second parameter values, using a predefined pitch factor modification function. Particularly, the predefined pitch factor modification function may have the first and second parameters and may be a function for mapping relative velocities to pitch factor modification values. Finally, the method may comprise rendering the audio source based on the pitch factor modification value.

20 Claims, 9 Drawing Sheets

(56) References Cited

U.S. PATENT DOCUMENTS

| | | | | |
|---|---|---|---|---|
| 5,719,944 | A | 2/1998 | Banerjea | |
| 7,218,240 | B2 | 5/2007 | Tillotson | |
| 7,492,915 | B2 | 2/2009 | Jahnke | |
| 7,563,168 | B2 | 7/2009 | Jahnke | |
| 8,831,255 | B2 | 9/2014 | Crawford | |
| 9,236,064 | B2 | 1/2016 | Savell | |
| 9,602,947 | B2 | 3/2017 | Oh | |
| 9,702,969 | B2 | 7/2017 | Hope Simpson | |
| 2003/0007648 | A1 | 1/2003 | Currell | |
| 2013/0202130 | A1 | 8/2013 | Zurek | |
| 2016/0034248 | A1 * | 2/2016 | Schissler | H04R 27/00 381/17 |
| 2020/0304935 | A1 | 9/2020 | Peters | |
| 2021/0264927 | A1 | 8/2021 | Kim | |

FOREIGN PATENT DOCUMENTS

| | | | |
|---|---|---|---|
| JP | 2021507559 | A | 2/2021 |
| RU | 2736418 | C1 | 11/2020 |
| WO | 20190161314 | W | 8/2019 |

OTHER PUBLICATIONS

Kelly, Robert E. "Musical pitch variations caused by the Doppler effect", American Journal of Physics, Jun. 1974, vol. 42, Issue 6, pp. 452-455.

Labschutz, M. et al., "Realistic real-time audio rendering in virtual environments", Institute of Computer Graphics and Algorithms, TU Wien, 2011. Available at: https://www.cg.tuwien.ac.at/research/publications/2011/labschuetz-2011-rsr/labschuetz-2011-rsr-paper.pdf.

Quackenbush, S. R. and Herre, J., "Mpeg Standards for Compressed Representation of Immersive Audio", Proceedings of the IEEE, vol. 109, Issue 9, pp. 1578-1589, Sep. 2021 (IEEE Xplore early access May 20, 2021), DOI: 10.1109/JPROC.2021.3075390. Available at: https://www.researchgate.net/publi.

* cited by examiner

METHODS, APPARATUS AND SYSTEMS FOR CONTROLLING DOPPLER EFFECT MODELLING

CROSS-REFERENCE TO RELATED APPLICATIONS

This application is a U.S. National Stage application under U.S.C. 371 of International Application No. PCT/EP2022/080117, filed on Oct. 27, 2022, which claims priority of the following priority application: U.S. provisional application 63/273,185, filed 29 Oct. 2021 and European Patent Application No. 21205769.9 filed on Nov. 1, 2021.

TECHNICAL FIELD

The present disclosure is directed to the general area of Doppler effect modelling, and more particularly, to methods and apparatuses for controlling the Doppler effect modelling, for example for use in virtual reality or augmented reality environments.

BACKGROUND

Generally speaking, the term Doppler effect (or Doppler shift) is typically used to refer to an audio effect that is experienced when there is a change in frequency of a wave (e.g., an audio wave) in relation to an observer (e.g., a listener) who is moving relative to the wave source (e.g., an audio source). More specifically, the Doppler effect may be generally perceived that when the wave source (e.g., a siren of an emergency vehicle) approaches the observer, the pitch (which is a commonly used measure indicative of the frequency or perceived frequency) goes higher; whilst when the wave source passes by and moves farther away, the pitch goes lower.

Nowadays, the Doppler effect has begun to be considered as an important aspect of audio rendering of dynamic scenes in a 6 degrees of freedom (6DoF) environment, which is widely employed for example in virtual reality (VR) and/or augmented reality (AR) scenarios (e.g., gaming). Broadly speaking, within the context of audio processing (e.g., rendering), the Doppler effect may generally be modelled using audio pitch factor modification values.

In some conventional implementations, it is generally proposed to perform the Doppler effect modelling based on the physical description or approximation of the Doppler effect. However, such an approach generally has no means or ability to account for capabilities of the underlying signal processing unit for pitch factor modification (e.g., a high magnitude of pitch factor modification values for high relative velocities, singularity point, etc.), nor to control pitch factor modification values (i.e., representing the strength of the Doppler effect) according to content creator intent (or in other words, subjective listening experience).

There is a need for techniques of performing (controlling) the Doppler effect modelling, more particularly when rendering audio content for a 6DoF environment, such as in a virtual reality and/or augmented reality environment.

SUMMARY

In view of the above, the present disclosure generally provides a method of modelling a Doppler effect when rendering audio content for a 6 degrees of freedom (6DoF) environment, a method of encoding parameters for use in modelling a Doppler effect when rendering audio content for a 6DoF environment, as well as a corresponding audio renderer, an encoder, a program, and a computer-readable storage media, having the features of the respective independent claims.

According to a first aspect of the present invention, a method of modelling a Doppler effect when rendering audio content for a 6DoF environment is provided. The method may be performed on a user side, or in other words, in a user (decoding) side environment.

In particular, the method may comprise obtaining first parameter values of one or more first parameters indicative of an allowable range of pitch factor modification values. The allowable range of the pitch factor modification values may be indicated by using an upper limit (e.g., boundary) and/or a lower limit (e.g., boundary), for example. The method may further comprise obtaining a second parameter value of a second parameter indicative of a desired strength (or in some cases also referred to as "aggressiveness") of the to-be-modelled Doppler effect. The method may yet further comprise determining a pitch factor modification value based on a relative velocity between a listener and an audio source in the audio content, and the first and second parameter values, using a predefined pitch factor modification function. Particularly, the predefined pitch factor modification function may have the first and second parameters (or in other words, may take, among others, the first and second parameters as input) and may be a function for mapping relative velocities to pitch factor modification values. Notably, as can be understood and appreciated by the skilled person, the pitch factor modification value may be seen as a value (possibly being represented in any suitable form) generally used for suitably modifying (e.g., shifting) the pitch, thereby enabling a suitable and proper modelling of the Doppler effect and rendering of the audio content in the 6DoF environment. Finally, the method may comprise rendering the audio source based on the (determined) pitch factor modification value.

Put differently, in a broad sense, the present disclosure generally proposes a method that makes use of a predefined (or predetermined/pre-implemented) pitch factor modification function to map relative velocities into corresponding pitch factor modification values, for modelling the Doppler effect (e.g., when rendering the audio content in the 6DoF environment). As will be described in more detail below, such predefined pitch factor modification function may be implemented in any suitable means, provided certain requirements (or properties) to be generally fulfilled. Specifically, the predefined pitch factor modification function may have a plurality of parameters (or in other words, take a plurality of parameters as input), among which are (at least) the first parameter(s) indicative of the allowable range of the pitch factor modification values and the second parameter indicative of the desired strength (aggressiveness) of the to-be-modelled Doppler effect. Then, in practice, when the proposed method is being performed, e.g., by an audio rendering device (or simply referred to as an audio renderer) where the predefined pitch factor modification function is being deployed, the audio rendering device may be configured to obtain the first and second parameter values corresponding to the first and second parameters, respectively. The obtaining of the first and second parameter values may be performed in any suitable means, depending on various requirements and/or implementations. For instance, in some possible cases, the first and second parameter values may be derived (or simply extracted) from a bitstream received from an encoding device; or in some other possible cases, obtained (or simply read out) from a file or a lookup table (LUT). As such, particularly by applying the pitch factor modification function, the pitch factor modification values for modelling the Doppler effect may be determined based on the relative velocities between the listener and the audio source, and also based on the first and second parameter values.

Configured as described above, the proposed method can provide an efficient and flexible mechanism for performing (e.g., controlling) the Doppler effect modelling when rendering the audio content for the 6DoF environment, while at the same time taking into account both the (allowable or acceptable) capabilities of the underlying signal processing unit (e.g., of the audio renderer) for the pitch factor modification (e.g., a high magnitude of pitch factor modification values for high relative velocities, singularity point, etc.) and also the possibility to control the (desired) pitch factor modification values (e.g., representing the desired strength/aggressiveness of the to-be-modelled Doppler effect) according to the intent of the content creator (in other words, subjective listening experience), thereby improving the perceived listening experience (at the listener side, e.g., a user playing a game in a VR environment).

Moreover, since the pitch factor modification function is already pre-implemented as a predefined function that takes, among others, values of both the first and second parameters as input, there is generally no need to redesign (or re-implement) a new pitch factor modification function every time the rendering condition changes (e.g., a different renderer with different processing capabilities being deployed, a different audio content created by a different author and/or for a different scene, etc.). Rather, it is generally needed to only communicate (e.g., using a bitstream coded at an encoding side) different first and second parameter values representing the corresponding allowable ranges (e.g., limits) of pitch factor modification values and the corresponding desired strength of the to-be-modelled Doppler effect, respectively. As such, in some possible scenarios, the predefined pitch factor modification function may be implemented as simple as a plugin or library (taking the first and second parameters as input for modelling the desired Doppler effect) that can be deployed in various software and/or platforms, and that can be further customized if needed, depending on various requirements and/or implementations. Thereby, unnecessary redesign/re-implementation of the pitch factor modification functions would be avoided, further improving the efficiency in the overall audio rendering process.

In some example implementations, the relative velocity may be calculated based on positions (e.g., relative positions) of the listener and the audio source. For instance, in some possible cases, the relative velocity may be determined from a rate of change (e.g., by taking the $1^{st}$-order derivative) of the relative distances between the audio source and the listener based on their respective position. Of course, any other suitable means may be adopted for obtaining or calculating the relative velocities, as will be understood and appreciated by the skilled person.

In some example implementations, the one or more first parameters may comprise parameters that are indicative of upper and/or lower limits of the allowable range of pitch factor modification values.

In some example implementations, the allowable range of pitch factor modification values may reflect a processing capability of an audio renderer rendering the audio content. That is to say, broadly speaking, the first parameter(s), i.e., that are indicative of the allowable range (e.g., upper and/or lower limits) of the pitch factor modification values, may be seen in some perspective as to represent a range of processing capabilities that are supported by the rendering device (e.g., an audio renderer), or more precisely, the underlying processing unit of that rendering device for modelling the Doppler effect.

In some example implementations, if the allowable range of pitch factor modification values so obtained could not be supported by (the underlying processing unit of) the audio renderer, a default range of pitch factor modification values may be used by that audio renderer. An illustrative example of such scenario may be that of a mobile device (e.g., a mobile phone) with (relatively) limited processing (rendering) capability that obtains (e.g., receives) a range of pitch factor modification values that have been set (e.g., by an encoding device) originally to target for a (relatively) more powerful rendering device (e.g., a gaming console or a professional work station). In such a scenario, it may be considered more practical for the mobile device to, instead of using the obtained unsupported parameter value(s), apply a default range parameter setting (e.g., falling into the originally obtained wider range) that may be, for example, set by the manufacturer (of the mobile device) to more correctly reflect the actual processing (rendering) capability of that mobile device, in order to avoid unexpectedly or adversely affecting the rendering process.

In some example implementations, the second parameter may control a slope (or in some possible cases, also referred to as "strength") of the pitch factor modification function that may be seen as reflecting the aggressiveness of the to-be-modelled Doppler effect.

In some example implementations, the audio content may be extracted from a received bitstream. The bitstream may have been encoded by an encoding device for example, by using any suitable means and in any suitable format. Accordingly, depending on various implementations, the first and second parameter values may be derived (e.g., extracted, decoded, etc.) from indications included in the bitstream. In some possible cases, the indications of the first and second parameter values may be encoded as labels (or fields) in the bitstream, as will be understood and appreciated by the skilled person.

Of course, it is also possible that in some other possible implementations, the audio content, and the first and second parameters may be obtained separately (e.g., from two separate bitstreams).

In some example implementations, the second parameter value may be set by a content creator of the audio content. Particularly, the second parameter value may be set by the content creator of the audio content according to the intent of that content creator. Thus, in a broad sense, the second parameter value may also be seen to reflect the subjective listening experience that is aimed for by the content creator (and that is controlled by the content creator).

In some example implementations, the second parameter value may be set by modelling a real-world reference and/or artistic expectations for the desired Doppler effect strength. Of course, any other suitable implementation for determining and setting the second parameter value may be possible as well, as will be understood and appreciated by the skilled person.

In some example implementations, rendering the audio content based on the pitch factor modification value may comprise adjusting a pitch of the audio source in the audio content based on the pitch factor modification value.

In some example implementations, a positive pitch factor modification value may generally indicate increasing the pitch of the audio source. Similarly, a negative pitch factor modification value may generally indicate decreasing the pitch of the audio source.

In some example implementations, the pitch adjustment of the audio source may be performed in units of semitones. For instance, a pitch factor modification value of 2 may simply mean to increase the pitch of the audio source by 2 semitones; and correspondingly, a pitch factor modification value of −2 may simply mean to decrease the pitch of the audio source by 2 semitones.

In some example implementations, the pitch factor modification function may be implemented based on a generalized logistic function. That is to say, in some possible cases, implementing the pitch factor modification function may involve for example modifying, as appropriate, a logistic function, or specifically, a generalized logistic function. However, it may be worthwhile to note that any other suitable means (e.g., formula or equation) may be used to implement such pitch factor modification function, provided that the so implemented pitch factor modification function fulfills certain properties, as will become more apparent in view of the description below.

In some example implementations, the pitch factor modification function may have one or more properties of: being continuous and monotonic with respect to relative velocities, having asymptotical limits controlled by the one or more first parameters, yielding zero pitch factor modification value at zero relative velocity, and/or having a slope in the vicinity of zero velocity that is controlled by the second parameter. Any other suitable properties may also be necessary in some possible implementations, as will be understood and appreciated by the skilled person.

In some example implementations, the pitch factor modification function F may be implemented as $$F(v, l, s) = \left(1 - \frac{l_h - l_l}{l_h - l_l e^{-vs}}\right) l_h,$$

where v represents the relative velocity, $l=\{l_l, l_h\}$ represents the first parameters with $l_l$ denoting the lower limit of the range and $l_h$ denoting the upper limit of the range, and s represents the second parameter. However, such function is merely provided as an example but not as limitation of any kind. As indicated above already, the skilled person would understand and appreciate that the pitch factor modification function F may be implemented in any other suitable manner as well.

In some example implementations, the method may further comprise outputting the rendered audio source (e.g., as part of the audio content) to a speaker or a headphone (or any other suitable playback device) for playback to the user, depending on various implementations or the user side environment (e.g., a computer, a gaming console, a mobile, etc.).

According to a second aspect of the present invention, a method of encoding parameters for use in modelling a Doppler effect when rendering audio content for a 6 degrees of freedom (6DoF) environment is provided. The parameters so encoded (e.g., at an encoder side or in an encoding side environment) by this method may be used by any of the methods described in the preceding first aspect and the example implementations thereof to model the Doppler effect when rendering the audio content for the 6DoF environment (e.g., at a user side or in a user/decoding side environment).

In particular, the method may comprise determining (e.g., calculating, setting, etc.) first parameter values of one or more first parameters indicative of an allowable range of pitch factor modification values. The method may further comprise determining (e.g., calculating, setting, etc.) a second parameter value of a second parameter indicative of a desired strength (or in some cases, also referred to as "aggressiveness") of the to-be-modelled Doppler effect. Finally, the method may yet further comprise encoding indications of the first and second parameter values. Specifically, as illustrated above, the first and second parameter values may be used for mapping a relative velocity between a listener and an audio source of the audio content to a pitch factor modification value based on a predefined pitch factor modification function, wherein the pitch factor modification value may be used for rendering the audio source, and the predefined pitch factor modification function may have the first and second parameters and may be a function for mapping relative velocities to pitch factor modification values.

Configured as described above, the proposed method can provide an efficient and flexible mechanism for encoding the parameters to be used for the Doppler effect modelling when rendering the audio content for the 6DoF environment, while at the same time taking into account both the (allowable or acceptable) capabilities of the underlying signal processing unit (at the audio renderer side) for the pitch factor modification (e.g., a high magnitude of pitch factor modification values for high relative velocities, singularity point, etc.) and also the possibility to control the (desired) pitch factor modification values (i.e., representing the desired strength of the Doppler effect) according to the intent of the content creator (in other words, subjective listening experience aimed for), thereby improving the perceived listening experience (at the listener side).

Moreover, as noted above, since the pitch factor modification function is already implemented and deployed as a predefined function (at the renderer side) taking the first and second parameters as input, there is generally no need to redesign (or re-implement) a new pitch factor modification function every time the rendering condition changes (e.g., a different renderer with different processing capabilities being deployed, a different audio content created by a different person and/or for a different scene, etc.). Instead, the encoding side may just communicate different first and second parameter values (e.g., encoded in a bitstream) representing the corresponding allowable ranges (limits) of pitch factor modification values and the corresponding desired strengths of the to-be-modelled Doppler effect, respectively. As such, in some possible scenarios, the predefined pitch factor modification function may be implemented as simple as a plugin (at the renderer side) that can be deployed in various software and/or platforms, and that can be further customized if needed, depending on various requirements and/or implementations. Thereby, unnecessary redesign/re-implementation of the pitch factor modification functions would be avoided, further improving the efficiency in the overall audio rendering process.

In some example implementations, the indications of the first and second parameter values may be encoded as labels (or fields) in a bitstream. As will be understood and appreciated by the skilled person, such indications may also be implemented in any other suitable means, as long as the corresponding rendering side device (where the predefined pitch factor modification function is being deployed) may be enabled to derive the first and second parameter values as necessary. As an example but not as a limitation of any kind, in some possible cases where the encoding method may be performed by a (game/control) engine (or sometimes also referred to as a game control logic engine) e.g. in an AR/VR gaming environment, it is understandable that the first and second parameter values (or the respective indications thereof) do not necessarily have to be always encoded into a bitstream (e.g., possibly due to the reason that the game engine may typically be located in the same environment, e.g., in the form of a PC, as the rendering and/or listening component), but may be encoded (or encapsulated) in any other suitable format (or even as plain or clear parameter values in some possible cases), together with or separate from the audio content.

In some example implementations, the indications of the first and second parameter values may be encoded together with the audio content in a single bitstream or as separate bitstreams.

In some example implementations, the first and second parameter values may be determined by a content creator or a game engine, as indicated above.

According to a third aspect of the present invention, an audio renderer (rendering apparatus) including a processor and a memory coupled to the processor is provided. The processor may be adapted to cause the audio renderer to carry out all steps according to any of the example methods described in the first aspect.

According to a fourth aspect of the present invention, an encoder (encoder apparatus) including a processor and a memory coupled to the processor is provided. The processor may be adapted to cause the encoder to carry out all steps according to any of the example methods described in the second aspect.

According to a fifth aspect of the present invention, a computer program is provided. The computer program may include instructions that, when executed by a processor, cause the processor to carry out all steps of the methods described throughout the present disclosure.

According to a sixth aspect of the present invention, a computer-readable storage medium is provided. The computer-readable storage medium may store the aforementioned computer program.

It will be appreciated that apparatus features and method steps may be interchanged in many ways. In particular, the details of the disclosed method(s) can be realized by the corresponding apparatus (or system), and vice versa, as the skilled person will appreciate. Moreover, any of the above statements made with respect to the method(s) are understood to likewise apply to the corresponding apparatus (or system), and vice versa.

BRIEF DESCRIPTION OF DRAWINGS

Example embodiments of the present disclosure are explained below with reference to the accompanying drawings, wherein.

DETAILED DESCRIPTION

Figure 1:
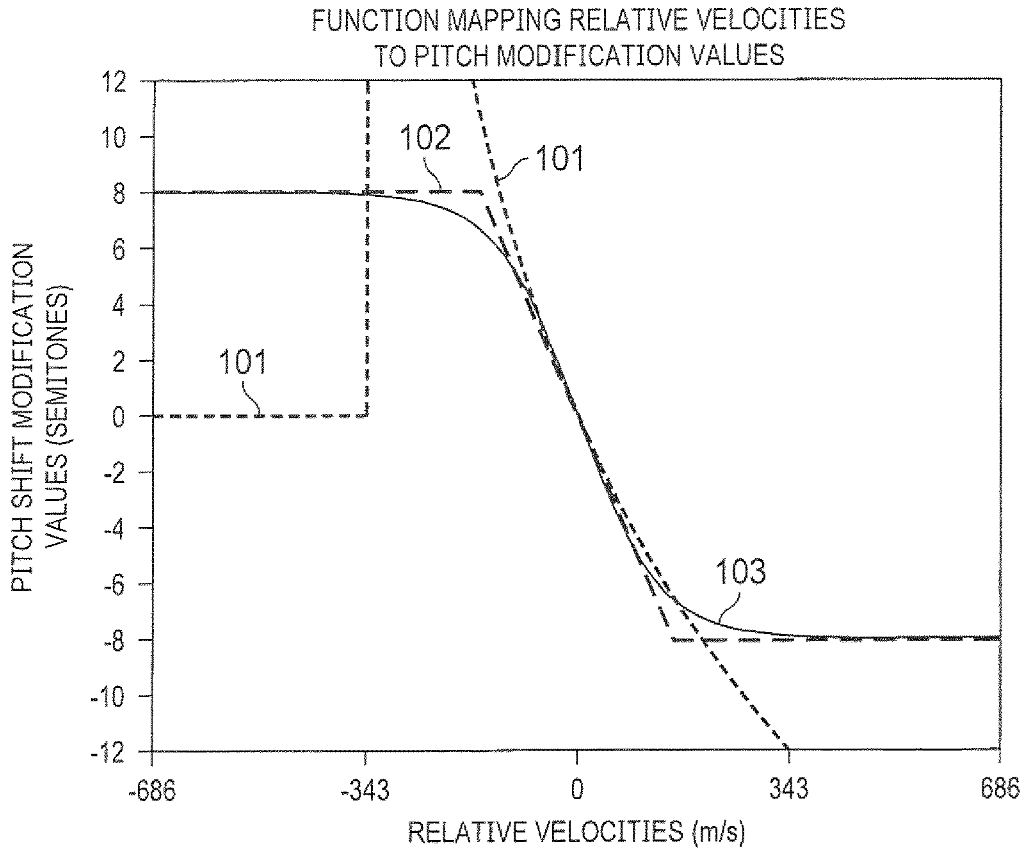
FIG. 1 is a schematic illustration showing exemplary function mappings between relative velocities and pitch modification values.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Furthermore, in the figures, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the present invention. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

As indicated above, the term "Doppler effect" or "Doppler shift" is generally used to refer to an audio effect that is experienced when there is a change in frequency of a wave (e.g., an audio wave) in relation to an observer (e.g., a listener) who is moving relative to the wave source (e.g., an audio source). Broadly speaking, the Doppler effect can be observed whenever the source of waves is moving with respect to the observer. The Doppler effect may be described as the effect produced by a moving source of waves in which there is an apparent upward shift in frequency for observers towards whom the source is approaching and an apparent downward shift in frequency for observers from whom the source is receding. It is nevertheless important to note that the effect does not result because of an actual change in the frequency of the source.

The Doppler effect may be observed for any type of wave-water wave, sound wave, light wave, etc., as can be understood and appreciated by the skilled person. An exemplary scenario where the Doppler effect may be commonly perceived could be an instance in which a police car or emergency vehicle is traveling towards a listener on the highway. As the car approaches with its siren, the pitch (a generally used measure for indicating the frequency) of the siren sound goes high (higher); and then after the car passes by and travels farther away, the pitch of the siren sound goes low (lower).

As has also been noted above, the Doppler effect has recently started to be considered as an important aspect in the audio rendering of dynamic scenes in a 6 degrees of freedom (6DoF) environment, which is widely employed for example in virtual reality (VR) and/or augmented reality (AR) scenarios (e.g., gaming, immersive content, etc.).

Broadly speaking, a semitone, also called a half step or a half tone, is generally the smallest musical interval commonly used in most tonal music and is considered the most dissonant when sounded harmonically. In general terms, the semitone is defined as the interval between two adjacent notes on a 12-tone scale. In other words, in most of the musical instruments that are designed on the basis of the tempered scale in which the octave is divided into twelve equal parts, the frequency ratio of any two semitones (half steps) is roughly the twelfth root of two.

Within the context of audio processing (e.g., audio rendering), the Doppler effect may generally be modelled using audio pitch factor (shift) modification values (sometimes also simply denoted as p throughout the present disclosure). Thus, following the general concept of semitones, in some possible implementations of the present invention, as will be described in more detail below, a positive pitch factor (shift) modification value may generally mean an increase of the pitch of the audio source, particularly in units of semitones. For instance, a pitch factor modification value of 2 may simply translate into an increase of 2 semitones of the audio source. Correspondingly, a negative pitch factor (shift) modification value may generally mean a decrease in the pitch (in units of semitones) of the audio source. However, also alternative frameworks and units for pitch factor modification values may be feasible in the context of the present invention, as the skilled person will appreciate.

Some approaches for modelling the Doppler effect may involve modelling based on the physical description and/or approximation of the Doppler effect. Thus, those approaches generally do not have means to account for capabilities of the underlying signal processing unit for pitch factor modification (e.g., a high magnitude of pitch factor modification values for high relative velocities, singularity point), nor to control pitch factor modification values (i.e., representing the strength of the Doppler effect) according to content creator intent (in other words, subjective listening experience).

In view thereof, the present invention may be generally seeking to address the problem of, given: 1) relative velocities (calculated based on listener and audio source positions, also denoted as v throughout the present disclosure); 2) a range of the pitch factor modification values supported by the signal processing unit (also denoted as l throughout the present disclosure); and 3) content creator setting (e.g., based on the (conventional) modelling equation, real-world reference, artistic expectations for Doppler effect strength, etc., also denoted as s throughout the present disclosure), finding suitable pitch modification values p that may perceptually correspond to the input data of 1)-3). Notably, in some possible implementations, the range of the pitch factor modification values l may itself comprise a lower limit $l_l$ and an upper (higher) limit $l_h$, such that the range l may also be denoted as $l=\{l_l, l_h\}$.

To address the above-identified problem, in a broad sense, the present invention generally proposes to consider implementing a pitch factor modification function F to map the relative velocities v to the pitch factor modification values p, accounting for the signal processing unit limitations l and the user-adjustable settings s. In some possible implementations, the pitch factor modification function F may be implemented as a modified generalized logistic function.

A possible example (not intended as a limitation of any kind) for implementing such pitch factor modification function F may be as follows:

$$F(v, l, s) = \left(1 - \frac{l_h - l_l}{l_h - l_l e^{-vs}}\right) l_h \tag{1}$$

where, as illustrated above, v denotes relative velocities between the listener and the audio source, $l\{l_l, l_h\}$ denotes the range of the pitch factor modification values supported by the underlying signal processing unit for performing the modelling (e.g., located in an audio renderer) with $l_l$ representing the lower limit and $l_h$ representing the upper limit respectively, s denotes the content creator setting (e.g., based on the (conventional) modelling equation, real-world reference, artistic expectations for Doppler effect strength, etc.), and e is a mathematical constant (the Euler's number).

Any equivalent representations of equation (1) shall be encompassed by the present invention. For example, as will be appreciated by the skilled person, the supported range of the pitch factor modification values may be expressed by any suitable combination of two parameters, which are considered to be encompassed by the present invention. For example, instead of using lower and upper limits $l_h$ and $l_h$, also an indication of either limit together with an indication $\Delta l=l_l-l_h$ or the like, of the size of the allowable range may be used. In this case, $l_h=\Delta l+l_l$ or $l_l=l_h-\Delta l$ would hold, for example, and could be used for modifying equation (1) above.

Further, also Euler's number in equation (1) could be replaced by alternative constants larger than 1, or swapping the sign of the exponent, alternative constants smaller than 1.

In addition, as will be understood and appreciated by the skilled person, the pitch factor modification function F may also be defined in any other suitable forms/formulas, depending on various requirements and/or implementations, provided the above-identified requirements (i.e., the range/limitation parameter l and the user/content creator setting s) being accounted for. The properties of the pitch factor modification function F may become more apparent in view of the below description accompanying the drawings.

Notably, in a broad sense, by applying the approaches as proposed in the present invention, values for parameters of the signal processing unit limitations l and the user setting(s) s may be enabled to be adjusted at the encoder side (and possibly to be put, e.g., encapsulated, into a bitstream). As such, a content creator may be enabled to establish control for the Doppler effect modelling to fit it to the capabilities of the audio renderer and at the same time also adjust it according to their own preferences.

Now regarding the drawings, FIG. 1 is a schematic illustration showing exemplary function mappings between relative velocities and pitch modification values based on different approaches for modelling the Doppler effect.

In particular, the x-axis schematically shows the (input) relative velocities between an audio source and an observer (e.g., a listener in the 6DoF environment). The relative velocities between the audio source and the observer/listener may be determined in any suitable means, e.g., based on positions of the listener and the audio source. For instance, in some possible implementations, the relative velocities may be determined based on the rate (e.g., the $1^{st}$ order derivative) of changes of the positions of the listener and the audio source (e.g., in terms of distance between the audio source and the observer/listener). Therein, negative values of the relative velocities may generally mean that the audio source and the observer/listener are approaching each other (getting closer to each other); whist positive values of the relative velocities may generally mean that the audio source and the observer/listener are moving (farther) away from each other, as will be understood and appreciated by the skilled person.

On the other hand, the y-axis schematically shows the (output) pitch shift modification values (e.g., in units of semitones). As illustrated above, in some possible implementations, positive values of the pitch shift modification values may generally mean an increase of the pitch of the audio source; whilst negative values of the pitch shift modification values may generally mean a decrease in the pitch of the audio source, e.g., both in units of semitones.

More particularly, diagram 101 in FIG. 1 generally shows an example of a (theoretical) reference of the Doppler effect model, e.g., based on a (theoretical) mathematical formula. Since diagram 101 generally represents a (theoretical) reference for modelling the Doppler effect, this diagram may not be fit for, e.g., real software implementations (or in other words, not fit for implementation in rendering audio content in the 6DoF environment), but may be seen as mainly to serve as representing a pure mathematical illustration for modelling the "nature" of the Doppler effect. Thus, the "cut-off" as shown in diagram 101 (at roughly −343 m/s) may generally be considered as due to the limitation of the speed of sound, as will be understood and appreciated by the skilled person. Similarly, the near-infinite pitch factor modification values when the relative velocities approach −343 m/s (from 0) also cause diagram 101 to appear to be somehow "segmented".

On the other hand, diagram 102 generally represents an example of a modelling of the Doppler effect according to a possible approach. Such modelling may be performed based on an estimation (approximation) of the (theoretical) mathematical formula, for example.

Moreover, diagram 103 (solid line) generally shows an example of a possible modelling of the Doppler effect according to an embodiment of the present invention. As illustrated above, this modelling of the Doppler effect—achieved through the (predetermined) pitch factor modification function F—comprises a plurality of parameters (or in other words, takes a plurality of parameters as input), among which are the range of the pitch factor modification values supported by the signal processing unit (i.e., l) and the content creator setting (i.e., s), based on, e.g., the (conventional) modelling equation, real-world reference, artistic expectations for Doppler effect strength, etc. More particularly, the parameter l is generally responsible for controlling the (upper and/or lower) limit of the Doppler effect model, while the parameter s is generally responsible for controlling the slope (or in some cases, also referred to as "strength" or "aggressiveness") of the Doppler effect model.

It is to be noted that in the specific example as shown in FIG. 1, the range/limit parameter l is exemplarily set to {−8, 8}, or in other words, $l=\{l_l, l_h\}=\{-8,8\}$ (as can be seen from the exemplary diagram 103 and also diagram 102); and the strength/aggressiveness parameter s is exemplarily set to 0.015. However, as will be understood and appreciated by the skilled person, these values of the parameters are merely set as possible examples (not as limitations of any kind), and any other suitable values may of course be used depending on various requirements and/or implementations.

As is clearly shown in the example of FIG. 1, diagram 102 (i.e., representing a possible modelling of the Doppler effect) generally exhibits a "rough"/"hard" change (or transaction) from lower speed range (roughly 0 to ±170 m/s) to higher speed range (roughly higher than ±170 m/s). In contrast, the transaction in those regions in diagram 103 (representing a possible implementation according to an embodiment of the present disclosure) appears to be "softer". Accordingly, the audio quality (of the audio content being rendered in accordance with the Doppler effect model of diagram 103) perceived by the listener (e.g., in the 6DoF environment) may be improved.

As indicated above, any suitable form/formula (other than the one exemplified in equation (1)) may be used to implement the pitch factor modification function F, provided at least the range/limitation parameter l and the user/content creator setting s being accounted for.

Nevertheless, it may be worthwhile to note a few properties that the pitch factor modification function F may need to fulfill, in order to achieve more or less similar performance (e.g., in terms of perceived audio quality) comparable to that of the above exemplified equation (1).

To be more specific, according to embodiments of the invention the pitch factor modification function F may have one or more properties of:

- being continuous and monotonic with respect to relative velocities,
- having asymptotical limits controlled by the one or more range/limit parameters (i.e., l),
- yielding zero pitch factor modification value at zero relative velocity, and/or
- having a slope in the vicinity of zero velocity that is controlled by the aggressiveness/strength parameter (i.e., s).

In some implementations, the pitch factor modification function F may have all of the above properties.

Figure 2:
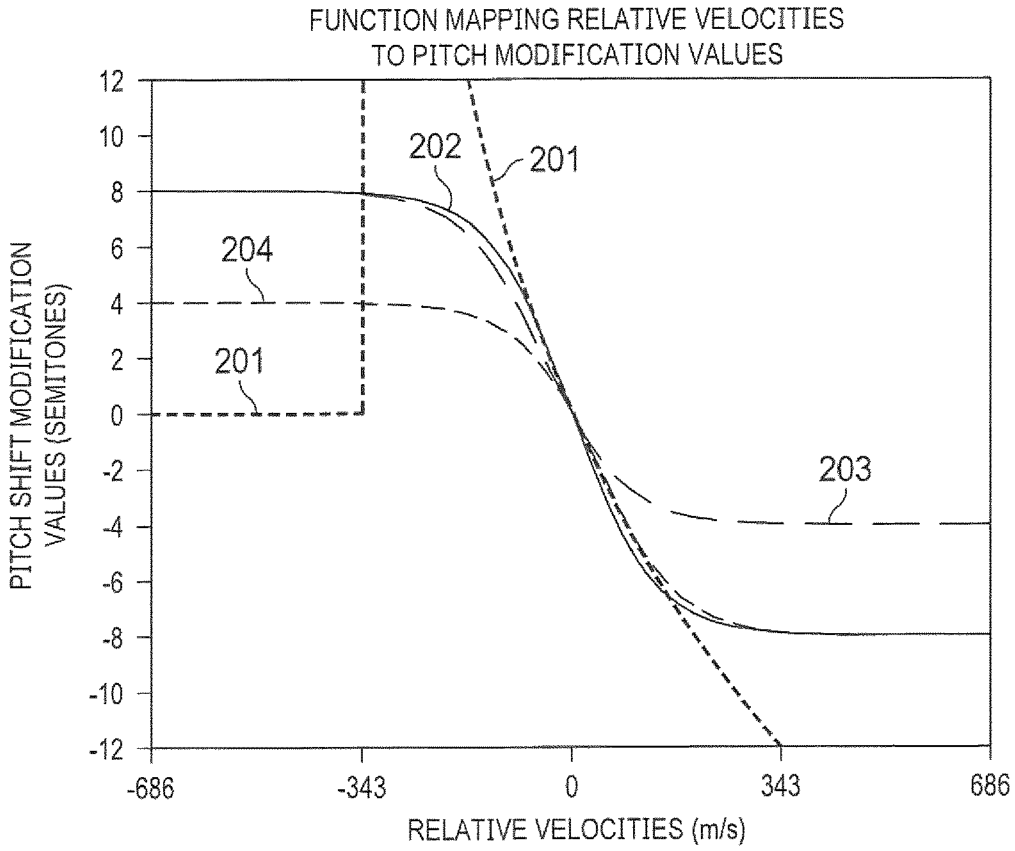
FIG. 2 is a schematic illustration showing exemplary function mappings between relative velocities and pitch modification values for different settings of the Doppler effect modelling range according to embodiments of the present invention.
Figure 3:
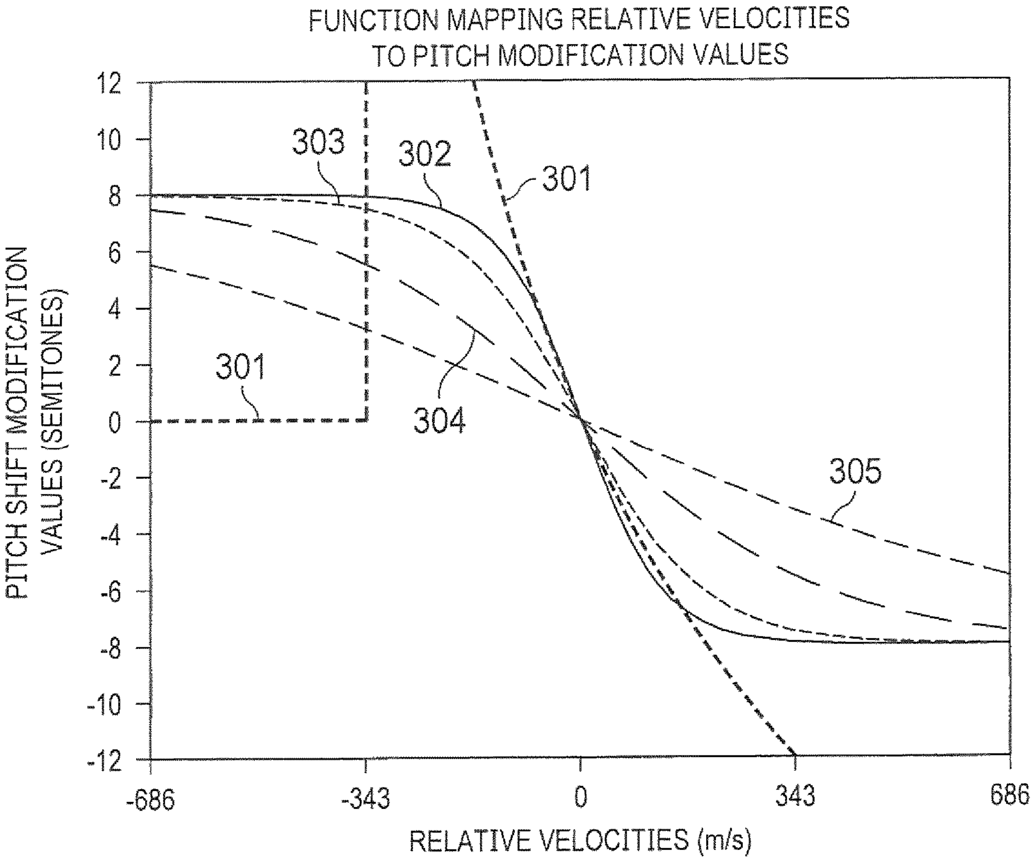
FIG. 3 is a schematic illustration showing exemplary function mappings between relative velocities and pitch modification values for different settings of the Doppler effect modelling strength according to embodiments of the present invention.

The above properties are also clearly reflected in diagram 103 which implements the pitch factor modification function F according to an embodiment of the present invention. Reference is now made to FIGS. 2 and 3 that schematically illustrate in more detail how different parameter settings affect the modelling of the Doppler effect. As illustrated above, in a broad sense, it may be understood that the signal processing unit setting (e.g., l) generally affects the asymptotical limits of the function more in the high relative velocity regions (e.g., as exemplified in FIG. 2); whist the content creator reference setting (e.g., s) generally affects the slope of the function F more around the low relative velocity region (e.g., as exemplified in FIG. 3).

In particular, FIG. 2 is a schematic illustration showing exemplary function mappings between relative velocities and pitch modification values for different settings of the Doppler effect modelling range parameter l according to embodiments of the present invention. Notably, diagram 201 in FIG. 2, being a (theoretical) mathematical representation of the Doppler effect, is the same as diagram 101 in FIG. 1, such that repeated description thereof may be omitted for the sake of conciseness.

Specifically, in the examples as shown in FIG. 2, the range/limit parameters $l=\{l_l, l_h\}$ for diagrams 202, 203 and 204 are exemplarily set to $l=\{-8,8\}$, $l=\{-4,8\}$, and $l=\{-8,4\}$, respectively. On the other hand, the slope parameter s in all diagrams 202, 203 and 204 is the same (which may be set to any suitable value, e.g., 0.015). Thus, as can be perceived from FIG. 2, diagrams 202, 203 and 204 appear to show more or less similar slope (particularly in the low-speed region), while only the respective upper and/or limits of the (output) pitch factor modification values are different, depending on the range/limit parameters $l=\{l_l, l_h\}$.

As mentioned above, the range/limit parameter l is generally set to be indicative of the range of the pitch factor modification values that are supported by the (underlying) signal processing unit (e.g., at the renderer side) for performing the Doppler modelling. Put differently, such parameter(s) l may also be seen as generally representing the (processing) capability (e.g., in terms of hardware and/or software capability) of the signal processing unit (or broadly speaking, of the renderer). Moreover, as has been noted above, the pitch factor modification function F may be typically implemented as a plugin (or encapsulated as some sort of library) that merely receives (e.g., from the encoding side) the range parameter(s) l along with the other inputs (e.g., the relative velocities, the content creator setting s, etc.). Thus, in some implementations, it may be possible that the so-received range parameter l unfortunately may not be supported (either completely or partially) by (the processing unit of) the renderer. An example of such a scenario may be that a mobile device (e.g., a mobile phone) with (relatively) limited processing (rendering) capability receives, along with the audio content for rendering, a range parameter l (e.g., $\{-8,8\}$) that has been set (e.g., by an encoder) originally to target for a (relatively) more powerful rendering device (e.g., a gaming console or a professional workstation). In such cases, it may be more practical for the mobile device to apply a default range parameter setting (e.g., $\{-4,8\}$ or $\{-8,4\}$), instead of using the received unsupported parameter l (e.g., $\{-8,8\}$). Here, the default range parameter setting may for example be set by the manufacturer (of the mobile device) to more correctly reflect the actual processing (rendering) capability of that mobile device, in order to avoid unexpectedly and adversely affecting the rendering process.

On the other hand, FIG. 3 is a schematic illustration showing exemplary function mappings between relative velocities and pitch modification values for different settings of the Doppler effect modelling strength parameter s according to embodiments of the present invention. Similar to the above, diagram 301 in FIG. 3, being a (theoretical) mathematical representation of the Doppler effect, is the same as diagram 101 in FIG. 1 (and the same as diagram 201 in FIG. 2), such that repeated description thereof may be omitted for the sake of conciseness.

In the examples as shown in FIG. 3 the slope/aggressiveness parameter s (e.g., mainly used for representing the content creator's intent for the subjective listening experience) in diagrams 302, 303, 304 and 305 are exemplarily set to s=0.015, s=0.010, s=0.005, and s=0.0025, respectively. On the other hand, the range parameter l in all diagrams 302, 303, 304 and 305 is the same (which may be set to any suitable value, e.g., $\{-8,8\}$). Thus, as can be perceived from FIG. 3, diagrams 302, 303, 304 and 305 appear to show varying slopes (particularly in the low-speed region), but more or less similar (theoretical) upper and/or limits of the (output) pitch factor modification values. Thereby, different "strengths" of the Doppler effect in the audio content being rendered may be perceived by the listener (e.g., in the 6DoF environment), e.g., depending on the intent of the content creator.

Summarizing, by appropriately setting the slope/aggressiveness parameter s (possibly followed by encoding/encapsulating the parameter value e.g., to a bitstream or other suitable format, and transmitting or communicating it to the user/decoder side device, or renderer in general), the content creator (or a "game engine" in some possible implementations) generally has the freedom to control the modelling behavior of the Doppler effect as desired, e.g., between no Doppler effect modelling at all to (near-) "real" (theoretical) Doppler effect modelling, or even over-emphasized Doppler effect modelling.

The present invention thus can be said to provide content creators with an additional degree of freedom relating to the modelling of the Doppler effect at the user side. As such, the present invention enables the content creator to selectively control or override Doppler effect modelling by the decoder/renderer in an object-specific manner. This is achieved by providing a set of parameter values to the user/decoder side device (including, eventually the actual renderer) in a suitable form. These parameter values may be encoded in a bitstream or may be provided to the renderer in any form suitable for or compatible with the renderer's data interfaces.

As an illustrative, non-limiting example, a use case of a VR scene having a flying jet with supersonic speed may be considered. If the actual laws of physics for Doppler effect modelling (e.g., corresponding to diagram 301 in FIG. 3) were to be applied, the user/listener (e.g., a gamer or other recipient of VR scene content) should probably perceive no sound from the jet at all, which would result in an unpleasant (yet physically realistic) VR experience (e.g., gaming experience). In that case, in particular by applying the methods as proposed in the present disclosure, the content creator (or an appropriately configured game engine) would have the freedom to control the modelling of the Doppler effect as desired. In other words, by appropriately setting for example the value of the slope/aggressiveness parameter s, the content creator (or the game engine) is given the freedom to, when considered necessary or desirable, override the renderer's Doppler modelling according to the laws of physics (e.g., corresponding to diagram 301 in FIG. 3) by using other modelling settings (e.g., corresponding to diagrams 302, 303, 304 or 305, etc.) which would result in a probably less accurate or less realistic, but more pleasant listening experience for the user in the VR environment. This example assumes that the renderer used for rendering the VR scene is capable of applying "default" Doppler effect modelling in accordance with or based on the laws of physics. In some example implementations, this default Doppler effect modelling may be realized by a specific set of parameter values for the aforementioned formula.

As another illustrative, non-limiting example, weaker Doppler effect modelling or possibly even no Doppler effect modelling at all may be applied for objects with relatively low speed or objects having speech (e.g., characters in a cartoon movie), while moderate or physically accurate Doppler effect modelling may be considered for others. For instance, considering a scene having a very fast audio object (such as a flying superhero, for example) that has speech attached thereto, it may be desirable to apply less or no Doppler effect modelling at all to the speech, but to apply at least some degree of Doppler effect modelling to the remaining sounds.

Figure 4:
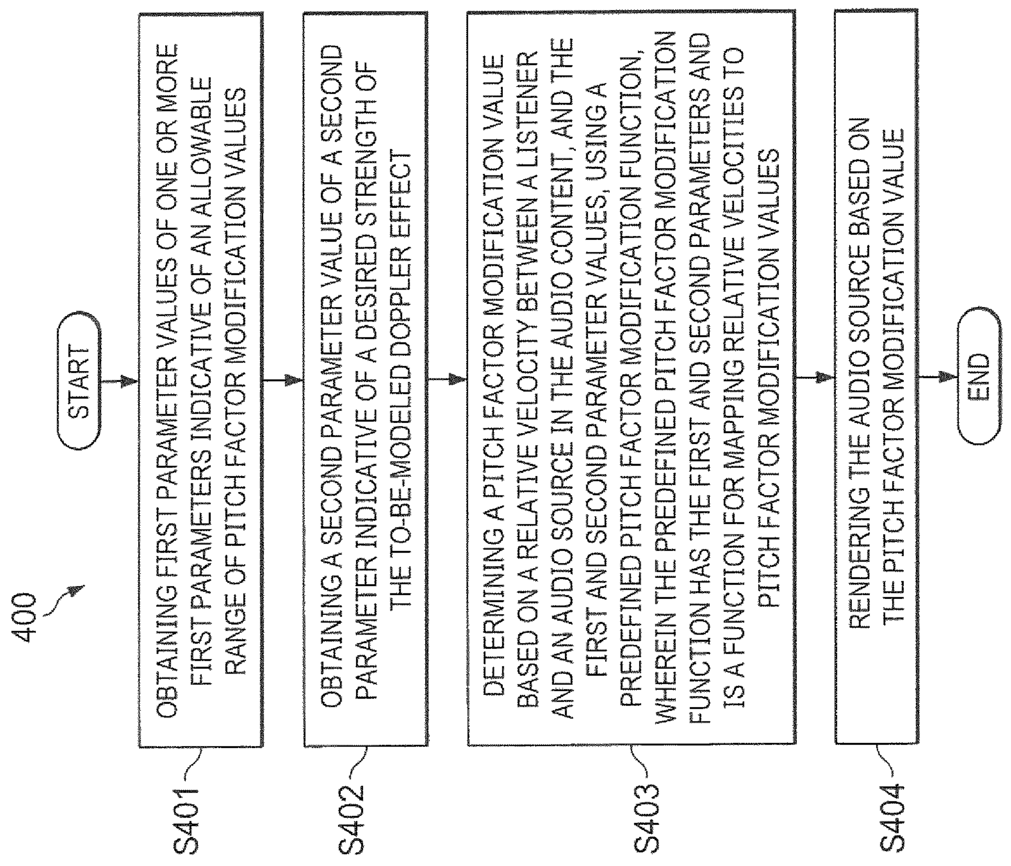
FIG. 4 is a schematic flowchart illustrating an example of a method according to embodiments of the present invention.

FIG. 4 is a schematic flowchart illustrating an example of a method 400 of modelling a Doppler effect when rendering audio content for a 6DoF environment according to embodiments of the present invention. Depending on implementations, the method may be performed in a decoder or user side environment (e.g., a VR/AR environment).

In particular, the method 400 may start at step S401 by obtaining (e.g., receiving) first parameter values of one or more first parameters indicative of an allowable range of pitch factor modification values. Subsequently, in step S402 the method 400 may comprise obtaining a second parameter value of a second parameter indicative of a desired strength of the to-be-modelled Doppler effect. The method 400 may then continue with step S403 by determining a pitch factor modification value based on a relative velocity between a listener and an audio source in the audio content, and the first and second parameter values, using a predefined pitch factor modification function. The pitch factor modification function may be predefined, e.g., pre-implemented as a plugin or library, in any suitable form in accordance with the above illustration with respect to FIGS. 1 to 3. More particularly, the predefined pitch factor modification function may have, among others, the first and second parameters (or in other words, may take the first and second parameters as (additional) inputs) and may be a function for mapping relative velocities to pitch factor modification values. Finally, the method 400 may comprise, in step S404, rendering the audio source based on the pitch factor modification value. Depending on implementations, the method may optionally further comprise a step of outputting the rendered audio source for example to an output (playback) device (e.g., corresponding to or comprising one or more speakers, headphones, etc.), where the rendered audio output (signal) with the modelled Doppler effect may be played back and perceived by the user.

As mentioned above, the proposed method 400 generally may make use of a predefined (or predetermined/pre-implemented) pitch factor modification function to map relative velocities into corresponding pitch factor modification values, for modelling the Doppler effect (e.g., when rendering the audio content in the 6DoF environment). During operation, in practice, when the proposed method 400 is performed, for example by an audio rendering device (e.g., an audio rendering device of an AR/VR device in the user side environment) where the predefined pitch factor modification function is being deployed, the audio rendering device may be configured to obtain the first and second parameter values corresponding to the first and second parameters, respectively. For example, the audio rendering device may obtain the first and second parameter values for the audio source on a frame basis, e.g., for each frame or for each key frame. Accordingly, the present disclosure provides for time-dependent and/or object-specific control of Doppler effect modelling.

The actual obtaining of the first and second parameter values may be performed in any suitable manner, depending on requirements and/or implementations. For instance, in some possible implementations, the first and second parameter values may be derived (e.g., decoded or extracted) from a bitstream that has been encoded and sent by an encoding device (for example as described in method 500 below in connection with FIG. 5). In some other possible implementations, the first and second parameter values may be obtained (e.g., simply read out) from a file or a lookup table (LUT) for example stored in memory of the user device, based on an indication in the bitstream. In that case, the encoding side environment/device may send for example an appropriate pointer, reference or index that is for example encoded in the bitstream, in plain/clear, or in any other suitable form.

It is also to be noted that depending on how the actual audio content itself is encoded and/or transmitted, the decoding of the audio content (e.g., audio signal) at the user side may be performed in any suitable manner and at any appropriate timing before the final rendering (step S404) takes place, as will be understood and appreciated by the skilled person. As such, the decoding of the actual audio content (e.g., audio signal) is independent from the determination of the pitch factor modification value.

Configured as described above, the proposed method can provide an efficient and flexible mechanism for performing (e.g., controlling) the Doppler effect modelling when rendering the audio content for the 6DoF environment, while at the same time taking into account both the (allowable or acceptable) capabilities of the underlying signal processing unit (of the audio renderer) for the pitch factor modification (e.g., a high magnitude of pitch factor modification values for high relative velocities, singularity point, etc.) and also giving the possibility to control the (desired) pitch factor modification values (i.e., representing the desired strength/aggressiveness of the to-be-modelled Doppler effect) according to the intent of the content creator (in other words, subjective listening experience), thereby improving the perceived listening experience (at the listener side, e.g., a gamer in a VR environment).

Moreover, since the pitch factor modification function is already pre-implemented as a predefined function taking, among others, values of both the first and second parameters as input, there is generally no need to redesign (or re-implement) a new pitch factor modification function every time the rendering condition changes (e.g., a different renderer with different processing capabilities being deployed, a different audio content having been created by a different author and/or for a different scene, etc.). Rather, it is generally necessary to only communicate (e.g., using a bitstream coded at an encoding side) different first and second parameter values representing the corresponding allowable ranges (e.g., limits) of pitch factor modification values and the corresponding desired strength of the to-be-modelled Doppler effect, respectively. As such, in some possible scenarios, the predefined pitch factor modification function may be implemented as simple as a plugin or library (taking the first and second parameters as input for modelling the desired Doppler effect) that can be deployed in various software and/or platforms, or that even can be further customized if necessary, depending on various requirements and/or implementations. Thereby, unnecessary redesign/re-implementation of the pitch factor modification functions would be avoided, further improving efficiency in the overall audio rendering process.

Figure 5:
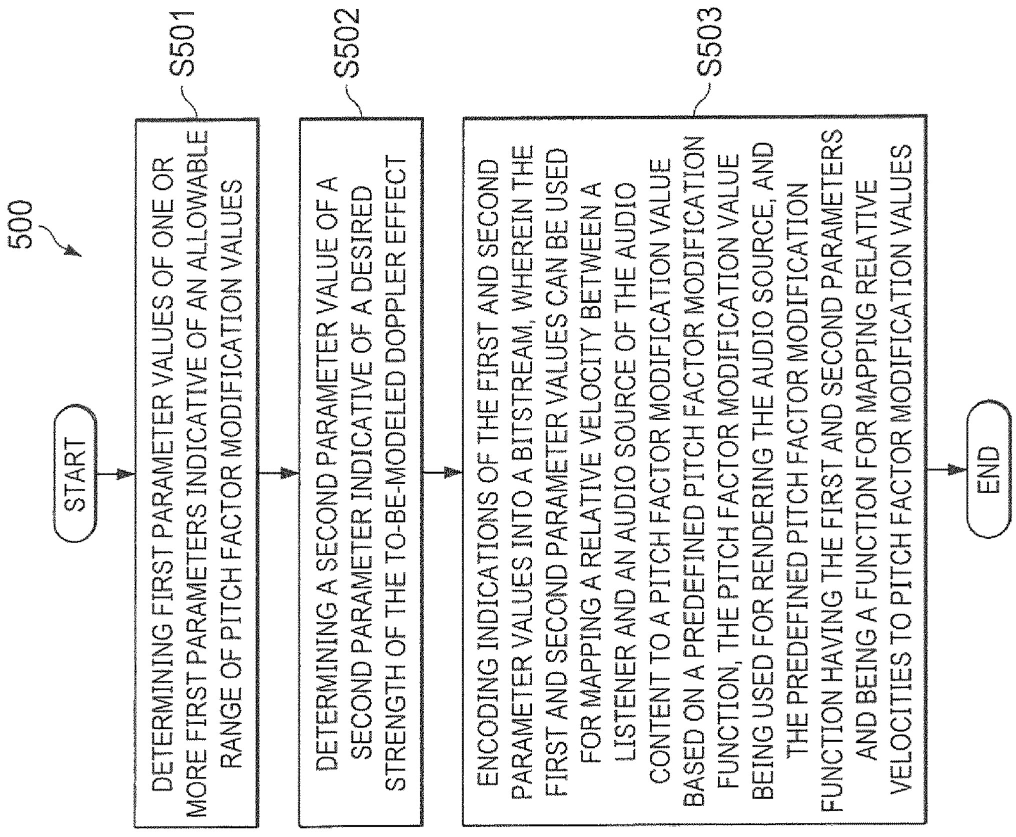
FIG. 5 is a schematic flowchart illustrating another example of a method according to embodiments of the present invention, FIGS. 6A and 6B schematically illustrate an exemplary comparison between audio signals processed by a conventional Doppler effect modelling approach and audio signals processed according to embodiments of the present invention, FIGS. 7A and 7B schematically illustrate another exemplary comparison between audio signals processed by a conventional Doppler effect modelling approach and audio signals processed according to embodiments of the present invention.

FIG. 5 is a schematic flowchart illustrating another example of a method 500 of encoding parameters for use in modelling a Doppler effect when rendering audio content for a 6DoF environment according to embodiments of the present invention. In other words, the parameters so encoded by this method 500 may be used by the preceding method 400 as described with reference to FIG. 4 to model the Doppler effect when rendering the audio content for the 6DoF environment. That is, in some possible implementations, the parameter values encoded by method 500 of FIG. 5 may be transmitted or communicated (in any suitable manner) to for example a user side device (e.g., in a user side or a decoding/rendering environment). The user side device may be configured to obtain the parameter values (e.g., decode from a bitstream) appropriately and perform the method 400 of modelling the Doppler effect as described above with respect to FIG. 4. Notably, depending on implementations, the encoding method 500 may be performed for example by an encoding device (or an encoder for short) utilizing user input from a content creator, a by a game engine, etc.

In particular, method 500 may start with step S501 by determining first parameter values of one or more first parameters indicative of an allowable range of pitch factor modification values. Subsequently, in step S502 the method 500 may comprise determining a second parameter value of a second parameter indicative of a desired strength of the to-be-modelled Doppler effect. Finally, the method 500 may in step S503 comprise encoding indications of the first and second parameter values. More particularly, the first and second parameter values can be used for mapping a relative velocity between a listener and an audio source of the audio content to a pitch factor modification value based on a predefined pitch factor modification function. As illustrated above, the pitch factor modification value may be used for rendering the audio source, and the predefined pitch factor modification function may have the first and second parameters and may be a function for mapping relative velocities to pitch factor modification values.

As will be understood and appreciated by the skilled person, the first and second parameter values may be encoded in any suitable manner. For instance, in some implementations, the first and second parameters may be encoded together with the audio content (e.g., audio signal) into a single bitstream, or into separate bitstreams. Also, depending on implementations and/or requirements, the first and second parameter values (possibly also with the audio content/signal) may be encoded into any suitable format, e.g., bitstream or data formats compatible with audio standards such as MPEG audio standards (e.g., the upcoming MPEG-I audio standard, etc.), with or without compression. In that case, the first and second parameter values may be encoded accordingly, e.g., as part of a header field, metadata, etc., as will be understood and appreciated by the skilled person. In some other possible cases, the first and second parameter values may be inserted (encapsulated) as plain variables (e.g., floating point numbers) into any suitable data format. The encoded bitstream(s) may also be transmitted or communicated to the user environment (e.g., comprising the decoding or rendering device) by using any suitable means, for example in wired or wireless manner.

Further, as mentioned above, the encoding method 500 as proposed in the present disclosure may be performed based on user input, for example by a content creator. In that case, the determination of the first parameter values at step S501 and/or the determination of the second parameter value at step S502 may be based on user input. Likewise, encoding method 500 may be performed by a (software-based) game engine (game control logic engine), depending on scenarios and/or implementations. In this case, the determinations at S501 and/or S502 would be performed in accordance with decision-routines of the game engine, for example based on a type and/or speed of the audio source.

To be more specific, in the case of user input from a content creator, in some possible implementations the content creator may obtain, by using any suitable means, information indicative of the processing capability or profile of the target decoding rendering device, in order to appropriately determine and set the values for the first parameters indicative of an allowable range of pitch factor modification values. In some possible implementations, it is also possible that the content creator may input a plurality of parameter sets for encoding (i.e., with respective first and second parameter values) for a respective plurality of target devices, with each one of the parameter sets comprising first and second parameter values targeted for a respective decoding/rendering device. In that case, the decoding/rendering device may simply pick or choose from the received parameter sets to obtain the respective first and second parameter values that best fit the decoding/rendering device (e.g., that best fit the profile or capability of the decoding/rendering device). In addition, the content creator may also need to, depending on various scenarios and/or implementations, determine whether to apply Doppler effect modelling at all or not, and if yes, to what extent (e.g., as illustrated above with respect to FIG. 3). For instance, in some possible implementations, the content creator may utilize and set a (global) flag (e.g., a specific bit field in the bitstream) to (globally) activate or deactivate the modelling of the Doppler effect. This flag is then to be encoded as well. In some other possible implementations, the content creator may simply set (e.g., by controlling the value of the second parameter indicative of the desired strength) the slope (aggressiveness) of the to-be-modelled Doppler effect to zero, instead of using the (global) flag. As such, compared to the global activation or deactivation, the content creator may have the further freedom to control the Doppler effect modelling in a more continuous manner (e.g., using frame by frame control of Doppler effect modelling).

On the other hand, in the case of a (software-based) game engine (e.g., for a VR/AR environment) performing the encoding task, the process is more or less the same as illustrated above with respect to user input from a (human) content creator, except for the fact that the role of the content creator is now substituted by the game engine. More specifically, it is now the game engine (or the developer(s) thereof) that may need to gain knowledge of the corresponding capability/profile of the rendering/decoding platform, and additionally to determine and control (e.g., by using any suitable logic/algorithm, machine learning, hard coded, etc.) the slope/aggressiveness of the modelling of the Doppler effect as appropriate, depending on implementations and/or requirements. In some possible case, mainly for reasons that in (real-time) rendering in a VR/AR environment the game engine (performing the encoding task) would typically be located together (e.g., in the same computer device or gaming console) with the decoding/rendering device/component, the values of the first and second parameters may not even have to be encoded into a bitstream, but may be communicated/transmitted to the decoding/rendering device/component in other suitable format (e.g., as plain variable, etc.). Also, depending on scenarios and/or implementations, the parameter values may be communicated periodically (e.g., on a frame basis) or on demand, or in any other suitable form.

Configured as described above, the proposed method can provide an efficient and flexible mechanism for encoding the parameters to be used for the Doppler effect modelling when rendering the audio content for the 6DoF environment, while at the same time taking into account both the (allowable or acceptable) capabilities of the underlying signal processing unit (at the audio renderer side) for the pitch factor modification (e.g., a high magnitude of pitch factor modification values for high relative velocities, singularity point, etc.) and also giving the possibility to control the (desired) pitch factor modification values (i.e., representing the desired strength of the Doppler effect) according to intent of the content creator (in other words, subjective listening experience), thereby improving the perceived listening experience (at the listener/user side).

Moreover, as noted above, since the pitch factor modification function is already implemented and deployed as a predefined function (at the renderer side) taking the first and second parameters as input, there is generally no need to redesign (or re-implement) a new pitch factor modification function every time the rendering condition changes (e.g., a different renderer with different processing capabilities being deployed, a different audio content having been created by a different person and/or for a different scene, etc.). Instead, the encoding side may just communicate different first and second parameter values (e.g., encoded in a bitstream) representing the corresponding allowable ranges (limits) of pitch factor modification values and the corresponding desired strengths of the to-be-modelled Doppler effect, respectively. As such, in some possible scenarios, the predefined pitch factor modification function may be implemented as simple as a plugin (at the renderer side) that can be deployed in various software and/or platforms, or can even be further customized if needed, depending on various requirements and/or implementations. Thereby, unnecessary redesign/re-implementation of the pitch factor modification functions would be avoided, further improving the efficiency in the overall audio rendering process.

It is finally noted that the minimum requirement(s) for the pitch factor modification function F recited above allow for a computationally simple implementation of this function, while still achieving realistic modelling of the Doppler effect. This may be particularly true for the explicit example for the pitch factor modification function F as given in equation (1) and equivalents thereof.

Now in FIGS. 6A-6B and FIGS. 7A-7B comparisons between audio signals processed by a possible Doppler effect modelling approach (e.g., in a user side environment) and audio signals processed according to embodiments of the present invention (e.g., in a user side environment) will be schematically illustrated. In other words, FIGS. 6A-6B and FIGS. 7A-7B generally show and compare respective rendering results (in the form of spectrograms) obtained by applying different modelling approaches for the Doppler effect. In particular, as can be understood and appreciated by the skilled person, in FIGS. 6A-6B and FIGS. 7A-7B, the x-axis generally represents time while the y-axis generally represents frequency.

Figure 6A:
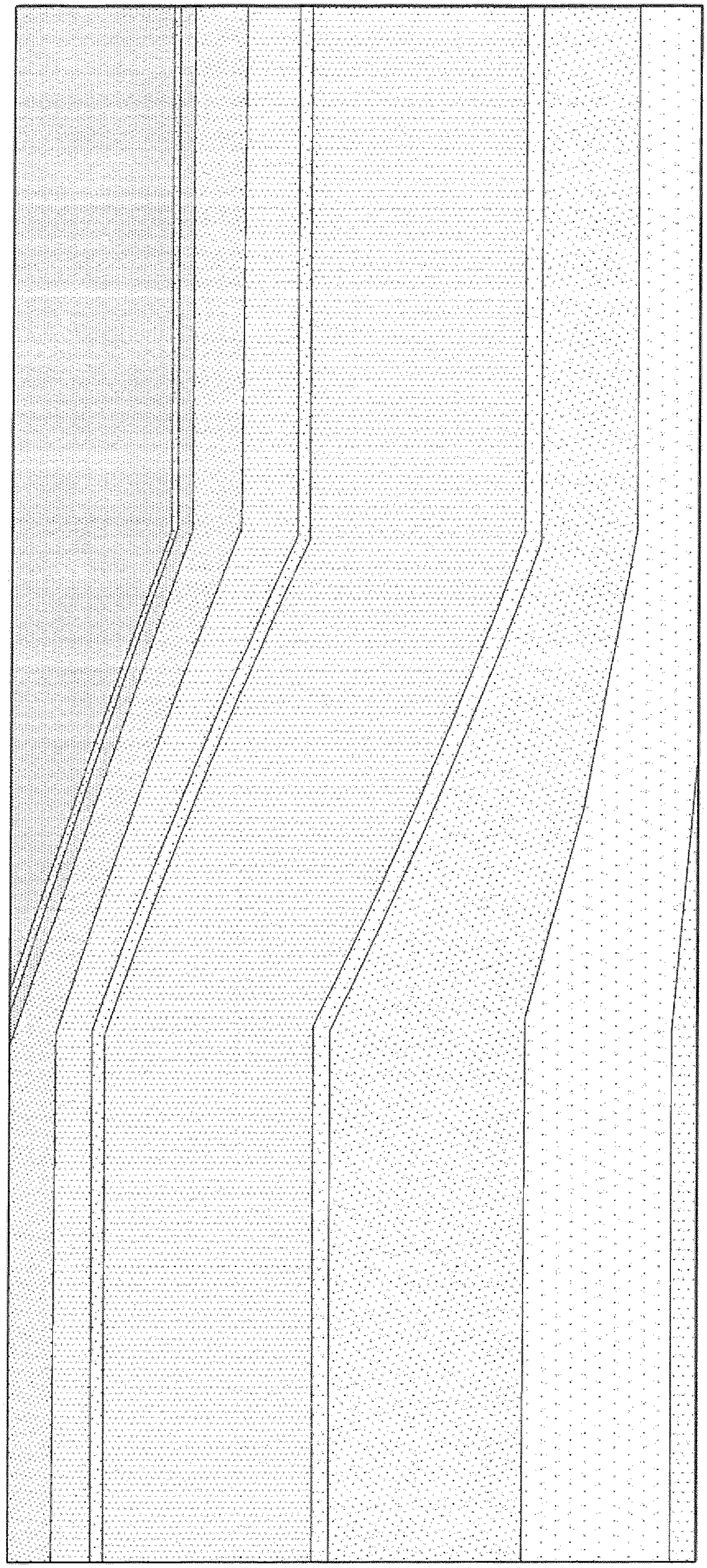
Figure 6B:
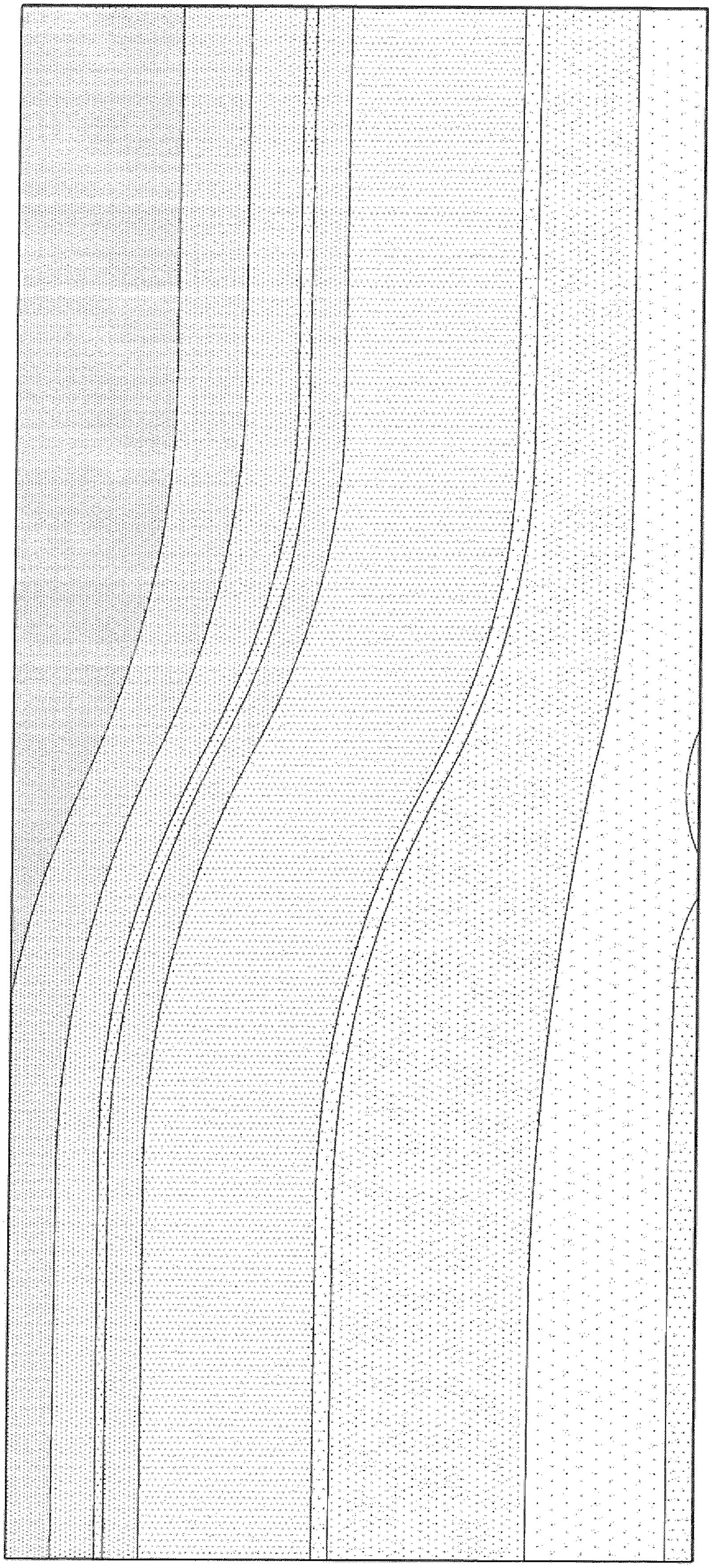
Figure 7A:
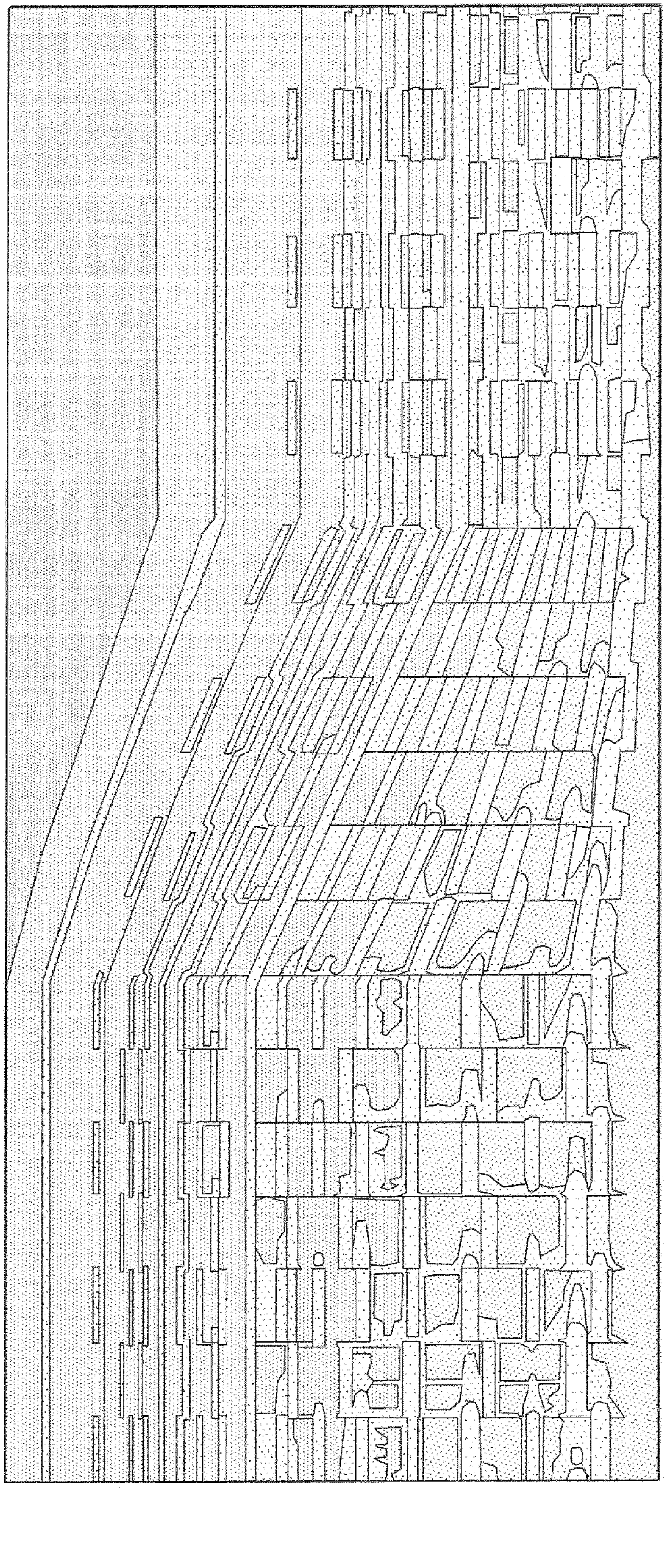
Figure 7B:
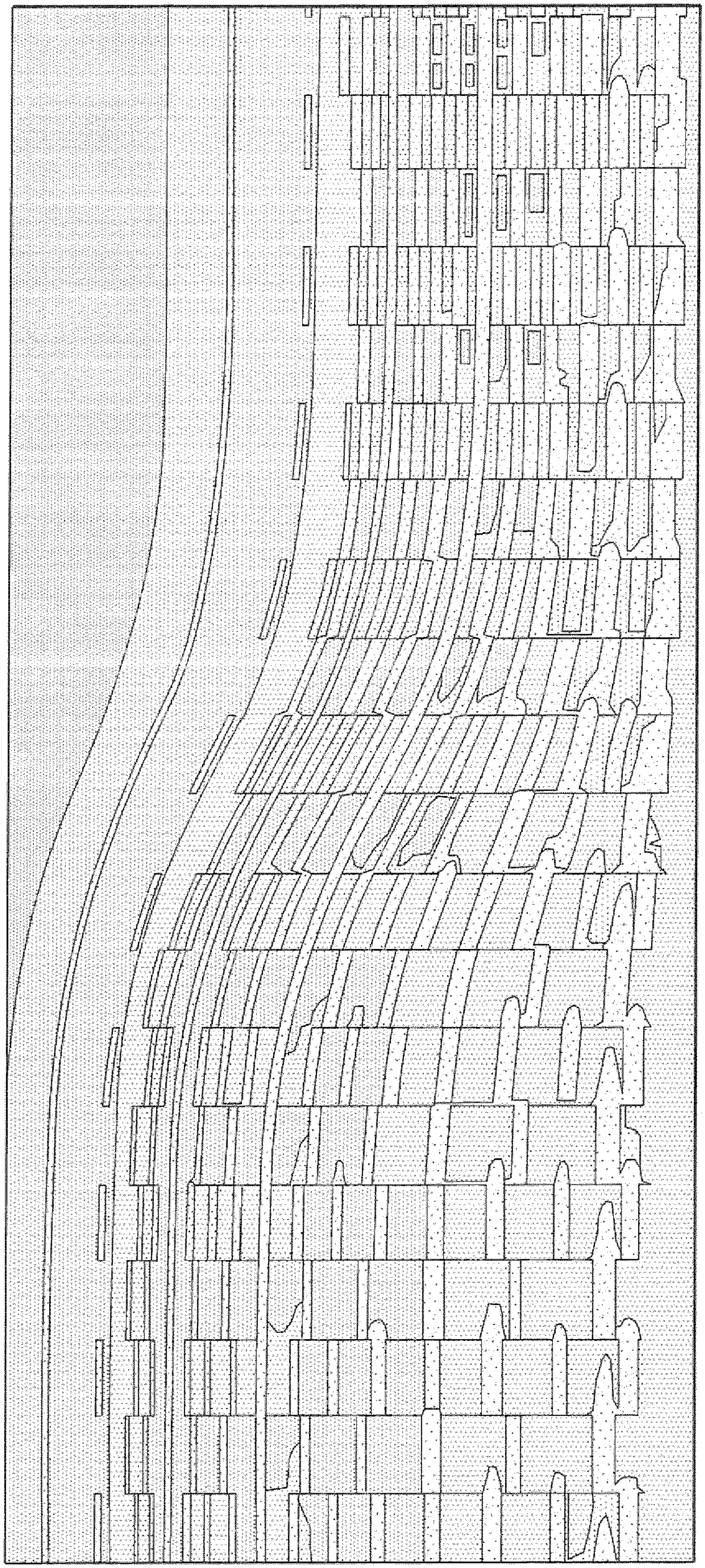

More particularly, as is reflected in FIG. 6A (according to a possible conventional modelling approach) in comparison with FIG. 6B (according to a possible implementation of the present invention) where the same exemplary audio signals "jet" are processed by respective modelling approaches, the pitch factor modification function F as proposed in the present invention (i.e., as exemplarily shown in FIG. 6B) generally exhibit a higher order of continuity (soft/smooth bends vs. hard/sharp bends) that would, in turn, result in better perceptual performance. Similar findings may also be observed in the comparison as shown in FIGS. 7A and 7B, where the same exemplary audio signals "siren" are processed by respective modelling approaches. In both cases of FIGS. 6A-6B and FIGS. 7A-7B, a constant acceleration of an audio source from −500 to +500 m/s is assumed, for the purpose of illustration. Notably, as will be understood by the skilled person, the lines or line structures shown in FIGS. 6A-6B and FIGS. 7A-7B that extend from the left edge of the diagrams to the right may be seen as representing "iso-energy" time/frequency slots, in the sense that these lines or line structures connect time/frequency slots with substantial equal or comparable energy density. As such, these lines or line structures show how energy density moved across frequency as time progresses.

Figure 8A:
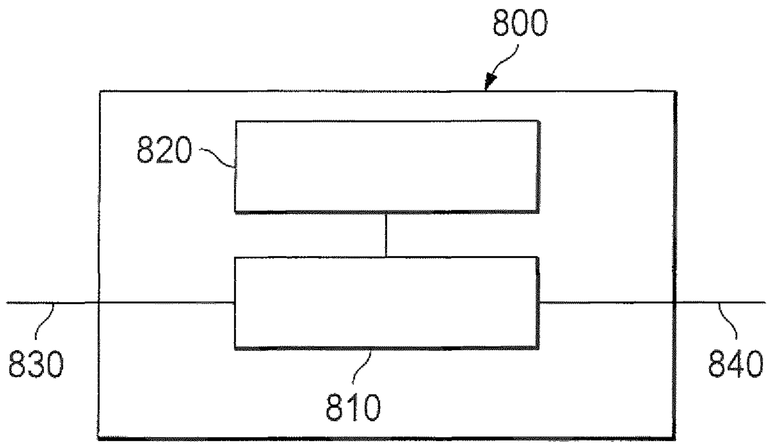
FIGS. 8A and 8B are block diagrams of example apparatuses for performing methods according to embodiments of the present invention.
Figure 8B:
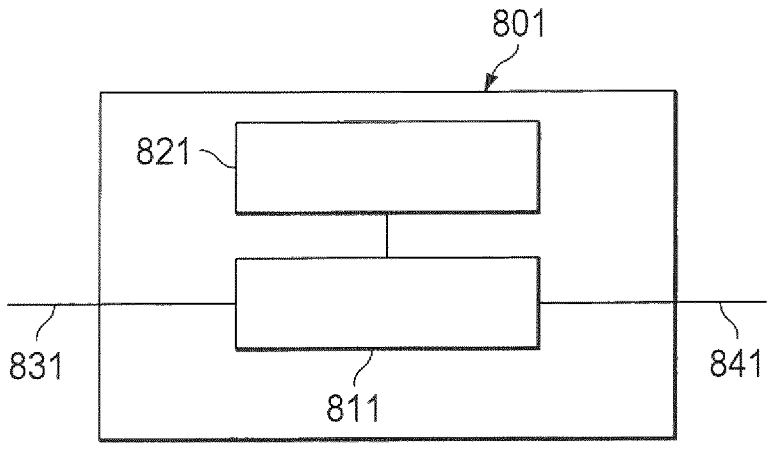

The present invention likewise relates to apparatuses for performing methods and techniques described throughout the present invention. FIGS. 8A and 8B generally show examples of such apparatuses 800 and 801, respectively. In particular, the apparatus 800 (or 801) comprises a processor 810 (or 811) and a memory 820 (or 821) coupled to the processor 810 (or 811). The memory 820 (or 821) may store instructions for the processor 810 (or 811). The processor 810 (or 811) may receive, among others, input data (e.g., in the form of a bitstream or any other suitable format) 830 (or 831). The processor 810 (or 811) may be adapted to carry out the methods/techniques described throughout the present invention and to generate correspondingly output data 840 (or 841). For instance, the apparatus 800 may, depending on circumstances, implement an audio renderer configured for carrying out the method 400 of modelling a Doppler effect when rendering audio content for a 6DoF environment as illustrated above with respect to FIG. 4; and the apparatus 801 may, depending on circumstances, implement an encoder configured for carrying out the method 500 of encoding parameters for use in modelling a Doppler effect when rendering audio content for a 6DoF environment as illustrated above with respect to FIG. 5, according to embodiments of the present invention.

Interpretation

A computing device implementing the techniques described above can have the following example architecture. Other architectures are possible, including architectures with more or fewer components. In some implementations, the example architecture includes one or more processors (e.g., dual-core Intel® Xeon® Processors), one or more output devices (e.g., LCD), one or more network interfaces, one or more input devices (e.g., mouse, keyboard, touch-sensitive display) and one or more computer-readable mediums (e.g., RAM, ROM, SDRAM, hard disk, optical disk, flash memory, etc.). These components can exchange communications and data over one or more communication channels (e.g., buses), which can utilize various hardware and software for facilitating the transfer of data and control signals between components.

The term "computer-readable medium" refers to a medium that participates in providing instructions to processor for execution, including without limitation, non-volatile media (e.g., optical or magnetic disks), volatile media (e.g., memory) and transmission media.

Transmission media includes, without limitation, coaxial cables, copper wire and fiber optics. Computer-readable medium can further include operating system (e.g., a Linux operating system), network communication module, audio interface manager, audio processing manager and live content distributor. Operating system can be multi-user, multiprocessing, multitasking, multithreading, real time, etc. Operating system performs basic tasks, including but not limited to: recognizing input from and providing output to network interfaces and/or devices; keeping track and managing files and directories on computer-readable mediums (e.g., memory or a storage device); controlling peripheral devices; and managing traffic on the one or more communication channels. Network communications module includes various components for establishing and maintaining network connections (e.g., software for implementing communication protocols, such as TCP/IP, HTTP, etc.).

Architecture can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Unless specifically stated otherwise, as apparent from the following discussions, it is appreciated that throughout the present invention discussions utilizing terms such as "processing", "computing", "calculating", "determining", "analyzing" or the like, refer to the action and/or processes of a computer or computing system, or similar electronic computing devices, that manipulate and/or transform data represented as physical, such as electronic, quantities into other data similarly represented as physical quantities.

Reference throughout this invention to "one example embodiment", "some example embodiments" or "an example embodiment" means that a particular feature, structure or characteristic described in connection with the example embodiment is included in at least one example embodiment of the present invention. Thus, appearances of the phrases "in one example embodiment", "in some example embodiments" or "in an example embodiment" in various places throughout this invention are not necessarily all referring to the same example embodiment. Furthermore, the particular features, structures or characteristics may be combined in any suitable manner, as would be apparent to one of ordinary skill in the art from this invention, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted", "connected", "supported", and "coupled" and variations thereof are used broadly and encompass both direct and indirect mountings, connections, supports, and couplings.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the present invention, various features of the present invention are sometimes grouped together in a single example embodiment, Fig., or description thereof for the purpose of streamlining the present invention and aiding in the understanding of one or more of the various inventive aspects. This method of invention, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this invention.

Furthermore, while some example embodiments described herein include some but not other features included in other example embodiments, combinations of features of different example embodiments are meant to be within the scope of the present invention, and form different example embodiments, as would be understood by those skilled in the art. For example, in the following claims, any of the claimed example embodiments can be used in any combination.

In the description provided herein, numerous specific details are set forth. However, it is understood that example embodiments of the present invention may be practiced without these specific details. In other instances, well-known methods, structures and techniques have not been shown in detail in order not to obscure an understanding of this description.

Thus, while there has been described what are believed to be the best modes of the present invention, those skilled in the art will recognize that other and further modifications may be made thereto without departing from the spirit of the present invention, and it is intended to claim all such changes and modifications as fall within the scope of the present invention. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE1. A method of modelling a Doppler effect when rendering audio content for a 6 degrees of freedom, 6DoF, environment on a user side, the method comprising:

obtaining first parameter values of one or more first parameters indicative of an allowable range of pitch factor modification values;

obtaining a second parameter value of a second parameter indicative of a desired strength of the to-be-modelled Doppler effect;

determining a pitch factor modification value based on a relative velocity between a listener and an audio source in the audio content, and the first and second parameter values, using a predefined pitch factor modification function; and rendering the audio source based on the pitch factor modification value, wherein the predefined pitch factor modification function has the first and second parameters and is a function for mapping relative velocities to pitch factor modification values.

EEE2. The method according to EEE 1, wherein the relative velocity is calculated based on positions of the listener and the audio source.

EEE3. The method according to EEE 1 or 2, wherein the one or more first parameters comprise parameters indicative of upper and/or lower limits of the allowable range of pitch factor modification values.

EEE4. The method according to any one of the preceding EEEs, wherein the allowable range of pitch factor modification values reflects a processing capability of an audio renderer rendering the audio content.

EEE5. The method according to EEE 4, wherein, if the allowable range of pitch factor modification values is not supported by the audio renderer, a default range of pitch factor modification values is used by the audio renderer.

EEE6. The method according to any one of the preceding EEEs, wherein the second parameter controls a slope of the pitch factor modification function that reflects aggressiveness of the to-be-modelled Doppler effect.

EEE7. The method according to any one of the preceding EEEs, wherein the audio content is extracted from a received bitstream, and the first and second parameter values are derived from indications included in the bitstream.

EEE8. The method according to any one of EEEs 1 to 6, wherein the audio content, and the first and second parameter values are obtained from separate bitstreams.

EEE9. The method according to any one of the preceding EEEs, wherein the second parameter value is set by a content creator of the audio content.

EEE10. The method according to any one of the preceding EEEs, wherein the second parameter value is set by modelling a real-word reference and/or artistic expectations for the desired Doppler effect strength.

EEE11. The method according to any one of the preceding EEEs, wherein rendering the audio content based on the pitch factor modification value comprises:

adjusting a pitch of the audio source in the audio content based on the pitch factor modification value.

EEE12. The method according to EEE 11, wherein a positive pitch factor modification value indicates increasing the pitch of the audio source.

EEE13. The method according to EEE 11 or 12, wherein the pitch adjustment of the audio source is performed in units of semitone.

EEE14. The method according to any one of the preceding EEEs, wherein the pitch factor modification function is based on a generalized logistic function.

EEE15. The method according to any one of the preceding EEEs, wherein the pitch factor modification function has one or more of properties of:

being continuous and monotonic with respect to relative velocities, having asymptotical limits controlled by the one or more first parameters, yielding zero pitch factor modification value at zero relative velocity, and/or having a slope in the vicinity of zero velocity that is controlled by the second parameter.

EEE16. The method according to any one of the preceding EEEs, wherein the pitch factor modification function F is implemented as:

$$F(v, l, s) = \left(1 - \frac{l_h - l_l}{l_h - l_l e^{-vs}}\right) l_h,$$

where v represents the relative velocity, $l=\{l_l, l_h\}$ represents the first parameters with $l_l$ denoting the lower limit of the range and $l_h$ denoting the upper limit of the range, and s represents the second parameter.

EEE17. The method according to any one of the preceding EEEs, further comprising: outputting the rendered audio source to a speaker or a headphone for playback to the user.

EEE18. A method of encoding parameters for use in modelling a Doppler effect when rendering audio content for a 6 degrees of freedom, 6DoF, environment, the method comprising:

determining first parameter values of one or more first parameters indicative of an allowable range of pitch factor modification values;

determining a second parameter value of a second parameter indicative of a desired strength of the to-be-modelled Doppler effect;

encoding indications of the first and second parameter values, wherein the first and second parameter values can be used for mapping a relative velocity between a listener and an audio source of the audio content to a pitch factor modification value based on a predefined pitch factor modification function, the pitch factor modification value being used for rendering the audio source, and the predefined pitch factor modification function having the first and second parameters and being a function for mapping relative velocities to pitch factor modification values.

EEE19. The method according to EEE 18, wherein the indications of the first and second parameter values are encoded as labels in a bitstream.

EEE20. The method according to EEE 18 or 19, wherein the indications of the first and second parameter values are encoded together with the audio content in a single bitstream or as separate bitstreams.

EEE21. The method according to any one of EEEs 18 to 20, wherein the first and second parameter values are determined by a content creator or a game engine.

EEE22. An audio renderer, comprising a processor and a memory coupled to the processor, wherein the processor is adapted to cause the audio renderer to carry out the method according to any one of EEEs 1 to 17.

EEE23. An encoder, comprising a processor and a memory coupled to the processor, wherein the processor is adapted to cause the encoder to carry out the method according to any one of EEEs 18 to 21.

EEE24. A program comprising instructions that, when executed by a processor, cause the processor to carry out the method according to any one of EEEs 1 to 21.

EEE25. A computer-readable storage medium storing the program according to EEE 24.

The invention claimed is:

1. A method of modelling a Doppler effect when rendering audio content for a 6 degrees of freedom, 6DoF, environment on a user side, the method comprising:

obtaining first parameter values of one or more first parameters indicative of an allowable range of pitch modification values, wherein the one or more first parameters comprise parameters indicative of upper and/or lower limits of the allowable range of pitch modification values;

obtaining a second parameter value of a second parameter indicative of a desired strength of the to-be-modelled Doppler effect;

determining a pitch modification value based on a relative velocity between a listener and an audio source in the audio content, and the first and second parameter values, using a predefined pitch modification function; and rendering the audio source based on the pitch modification value, wherein the predefined pitch modification function has the first and second parameters and is a function for mapping relative velocities to pitch modification values;

wherein the allowable range of pitch modification values reflects a processing capability of an audio renderer rendering the audio content; and wherein the second parameter controls a slope of the pitch modification function that reflects aggressiveness of the to-be-modelled Doppler effect.

2. The method according to claim 1, wherein the relative velocity is calculated based on positions of the listener and the audio source.

3. The method according to claim 1, wherein, if the allowable range of pitch modification values is not supported by the audio renderer, a default range of pitch modification values is used by the audio renderer.

4. The method according to claim 1, wherein the audio content is extracted from a received bitstream, and the first and second parameter values are derived from indications included in the bitstream.

5. The method according to claim 1, wherein the audio content, and the first and second parameter values are obtained from separate bitstreams.

6. The method according to claim 1, wherein the second parameter value is set by a content creator of the audio content.

7. The method according to claim 1, wherein the second parameter value is set by modelling a real-word reference and/or artistic expectations for the desired Doppler effect strength.

8. The method according to claim 1, wherein rendering the audio content based on the pitch modification value comprises:

adjusting a pitch of the audio source in the audio content based on the pitch modification value.

9. The method according to claim 8, wherein a positive pitch modification value indicates increasing the pitch of the audio source.

10. The method according to claim 8, wherein the pitch adjustment of the audio source is performed in units of semitone.

11. The method according to claim 1, wherein the pitch modification function is based on a generalized logistic function; and wherein the pitch modification function has one or more of properties of:

being continuous and monotonic with respect to relative velocities, having asymptotical limits controlled by the one or more first parameters, yielding zero pitch modification value at zero relative velocity, and/or having a slope in the vicinity of zero velocity that is controlled by the second parameter.

12. The method according to claim 1, wherein the pitch modification function F is implemented as:

$$F(v, l, s) = \left(1 - \frac{l_h - l_l}{l_h - l_l e^{-vs}}\right) l_h,$$

where v represents the relative velocity, l–{$l_l$, $l_h$} represents the first parameters with $l_l$ denoting the lower limit of the range and $l_h$ denoting the upper limit of the range, and s represents the second parameter.

13. The method according to claim 1, further comprising: outputting the rendered audio source to a speaker or a headphone for playback to the user.

14. A method of encoding parameters for use in modelling a Doppler effect when rendering audio content for a 6 degrees of freedom, 6DoF, environment, the method comprising:

determining first parameter values of one or more first parameters indicative of an allowable range of pitch modification values, wherein the one or more first parameters comprise parameters indicative of upper and/or lower limits of the allowable range of pitch modification values;

determining a second parameter value of a second parameter indicative of a desired strength of the to-be-modelled Doppler effect;

encoding indications of the first and second parameter values, wherein the first and second parameter values can be used for mapping a relative velocity between a listener and an audio source of the audio content to a pitch modification value based on a predefined pitch modification function, the pitch modification value being used for rendering the audio source, and the predefined pitch modification function having the first and second parameters and being a function for mapping relative velocities to pitch modification values;

wherein the allowable range of pitch modification values reflects a processing capability of an audio renderer rendering the audio content; and wherein the second parameter controls a slope of the pitch modification function that reflects aggressiveness of the to-be-modelled Doppler effect.

15. The method according to claim 14, wherein the indications of the first and second parameter values are encoded as labels in a bitstream.

16. The method according to claim 14, wherein the first and second parameter values are determined by a content creator or a game engine.

17. The method according to claim 14, wherein the first and second parameter values are determined by a content creator or a game engine.

18. An audio renderer, comprising a processor and a memory coupled to the processor, wherein the processor is adapted to cause the audio renderer to carry out the method according to claim 1.

19. An encoder, comprising a processor and a memory coupled to the processor, wherein the processor is adapted to cause the encoder to carry out the method according to claim 14.

20. A non-transitory, computer-readable storage medium storing instructions that when executed by at least one processor, causes the at least one processor to perform the method according to claim 1.

* * * * *